US011913559B2

(12) United States Patent
Nishimura et al.

(10) Patent No.: US 11,913,559 B2
(45) Date of Patent: Feb. 27, 2024

(54) SPOOL VALVE

(71) Applicant: Eagle Industry Co., Ltd., Tokyo (JP)

(72) Inventors: Naoki Nishimura, Tokyo (JP);
Tadanobu Kawato, Tokyo (JP);
Masaki Hoshi, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 17/762,020

(22) PCT Filed: Sep. 17, 2020

(86) PCT No.: PCT/JP2020/035283
§ 371 (c)(1),
(2) Date: Mar. 18, 2022

(87) PCT Pub. No.: WO2021/060146
PCT Pub. Date: Apr. 1, 2021

(65) Prior Publication Data
US 2022/0333709 A1    Oct. 20, 2022

(30) Foreign Application Priority Data

Sep. 24, 2019  (JP) ................... 2019-172708

(51) Int. Cl.
*F16K 11/07*    (2006.01)
*F16K 27/04*    (2006.01)

(52) U.S. Cl.
CPC ............ *F16K 27/041* (2013.01); *F16K 11/07* (2013.01)

(58) Field of Classification Search
CPC .................. F16K 11/07; F16K 27/041

USPC ................................................. 137/625.69
See application file for complete search history.

(56) References Cited

U.S. PATENT DOCUMENTS

| 6,453,947 B1 | 9/2002 | Inoue et al. .......... F15B 13/044 |
| 11,320,061 B2 | 5/2022 | Nishimura et al. ........................ F16K 31/0655 |
| 2007/0267078 A1 | 11/2007 | Collet et al. ............. 137/625.69 |
| 2012/0018656 A1 | 1/2012 | Holmes et al. .......... 251/129.15 |
| 2012/0255638 A1* | 10/2012 | Lehner ................ F16K 11/0716 137/625.69 |

(Continued)

FOREIGN PATENT DOCUMENTS

| CN | 208503125 | 2/2019 | ............. F15B 13/02 |
| JP | 54152347 | 10/1979 | ............. F16K 11/07 |

(Continued)

OTHER PUBLICATIONS

International Preliminary Report on Patentability issued PCT/JP2020/035283, datd Mar. 15, 2022, 5 pages.

(Continued)

*Primary Examiner* — Paul J Gray
(74) *Attorney, Agent, or Firm* — HAYES SOLOWAY P.C.

(57) ABSTRACT

A spool valve includes a sleeve and a spool arranged on an inside of a sleeve to be movable in a longitudinal direction, the sleeve being provided with an inflow port into which fluid is supplied from an external fluid supply hole, and an outflow port through which the fluid is flown to an outside of the sleeve, wherein a supply groove is formed on an outer periphery of the sleeve, and the supply groove includes an inlet space into which the fluid flows from the fluid supply hole and an outlet space formed on a side of the inflow port with respect to the inlet space in an axial direction.

13 Claims, 8 Drawing Sheets

(56) References Cited

U.S. PATENT DOCUMENTS

| | | | |
|---|---|---|---|
| 2014/0352828 A1 | 12/2014 | Landrum | F16K 11/07 |
| 2015/0285105 A1* | 10/2015 | Numakura | F16K 11/0716 137/625.69 |
| 2017/0138489 A1 | 5/2017 | Winkler | F16K 11/07 |
| 2017/0314700 A1 | 11/2017 | Iwanaga et al. | F16K 31/06 |
| 2019/0249788 A1 | 8/2019 | Tanimura et al. | F16K 11/0708 |

FOREIGN PATENT DOCUMENTS

| | | | |
|---|---|---|---|
| JP | 60034154 | 3/1985 | F16K 11/07 |
| JP | 2001263529 | 9/2001 | F16K 31/06 |
| JP | 4100161 | 3/2008 | F16K 31/06 |
| JP | 2009-236310 | 10/2009 | F16K 31/06 |
| JP | 2011-17381 | 1/2011 | F16H 61/00 |
| JP | 2012-522201 | 9/2012 | F16K 11/07 |
| JP | 2014238169 | 12/2014 | F16K 11/07 |
| JP | 2015-102150 | 6/2015 | F16K 51/00 |
| JP | 2018-13184 | 1/2018 | F16K 3/24 |
| JP | 2019143781 | 8/2019 | F16K 31/06 |
| WO | WO2019102909 | 5/2019 | F16K 31/06 |

OTHER PUBLICATIONS

International Search Report and Written Opinion issued in PCT/JP2020/035283, dated Nov. 2, 2020, with English translation, 12 pages.

International Preliminary Report on Patentability issued in PCT/JP2021/005975, dated Sep. 1, 2022, 12 pages.

International Search Report and Written Opinion issued in PCT/JP2021/005975, dated May 11, 2021, with English translation, 15 pages.

Chinese Official Action issued in Chinese Patent Application 202080066044.8, dated Sep. 29, 2023, 10 pages, with translation.

European Official Action issued in European Patent Application 20868996.8, dated Oct. 2, 2023, 8 pages.

\* cited by examiner

SPOOL VALVE

TECHNICAL FIELD

The present invention relates to a spool valve suitable for a fluid circuit.

BACKGROUND ART

In a spool valve, a spool placed within a sleeve is moved in an axial direction by a driving force of a solenoid or the like, so that the fluid flowing into an inflow port provided in the sleeve is flown out of an outflow port provided in the sleeve with the pressure and the flow rate of the fluid being adjusted.

A spool valve that is used by being fitted in a fitting hole provided in the housing is known. An inflow port in a sleeve is aligned with a fluid supply hole formed in the housing, and an outflow port in the sleeve is aligned with a fluid outflow hole formed in the housing. Further, the fluid supply hole is connected with the pressure source, and the fluid outflow hole is connected with the load or the like.

For example, a spool valve in Patent Citation 1 is a normally closed spool valve in which a spool blocks communication between an inflow port and an outflow port and no fluid flows from the inflow port into the sleeve during an off-state in which no power is supplied to a drive unit. During an on-state in which power is supplied to the drive unit, the spool is moved in the axial direction, so that fluid flows from the inflow port into the sleeve and the inflow port and the outflow port are communicated with each other. Thus, the flow rate of the fluid flowing out of the outflow port can be adjusted by the amount of movement of the spool in the axial direction.

CITATION LIST

Patent Literature

Patent Citation 1: JP 2009-236310 A (Page. 7, FIG. 1)

SUMMARY OF INVENTION

Technical Problem

When such a spool valve is provided and used in a fluid circuit, the spool may not be moved smoothly and predetermined control may not be performed. This is assumed to be due to the fact that the spool is pressed against the sleeve in a radial direction by the supply dynamic pressure of the fluid generated in the inflow port, and a large frictional force is generated between the outer peripheral surface of the spool and the inner peripheral surface of the sleeve. Particularly, in recent years, the control pressure of the fluid has been increasing, and when such a high-pressure fluid is used for the spool valve, in some cases, it has been to be difficult to carry out the predetermined control described above.

The present invention has been made in view of such a problem, and an object of the present invention is to provide a spool valve in which a spool is smoothly controlled regardless of whether the pressure is high or low.

Solution to Problem

In order to solve the problem described above, a spool valve according to the present invention includes a sleeve and a spool arranged on an inside of a sleeve to be movable in a longitudinal direction, the sleeve being provided with an inflow port into which fluid is supplied from an external fluid supply hole, and an outflow port through which the fluid is flown to an outside of the sleeve, wherein a supply groove is formed on an outer periphery of the sleeve, and the supply groove includes an inlet space into which the fluid flows from the fluid supply hole and an outlet space formed on a side of the inflow port with respect to the inlet space in an axial direction. According to the aforesaid feature of the present invention, when the fluid supplied from the fluid supply hole into the supply groove first flows into the inlet space, the supply dynamic pressure thereof is absorbed, and when it then moves to the outlet space formed on the side of the inflow port, the supply dynamic pressure thereof is further absorbed. Thus, the spool is smoothly controlled regardless of whether the control pressure of the fluid is high or low.

It may be preferable that the inlet space is formed into an annular shape. According to this preferable configuration, the fluid is held within the annular inlet space, so that the fluid is easily absorbed.

It may be preferable that the spool valve includes a partition wall adjacent to the inlet space and formed to protrude in a radially outward direction of the sleeve, the partition wall having a communication portion formed to communicate the inlet space and the outlet space. According to this preferable configuration, the fluid flowing into the inlet space is bypassed by the communication portion formed in the partition wall and is flown to the outlet space, so that the fluid can be absorbed.

It may be preferable that the communication portion is a cutout formed on the outer periphery of the partition wall. According to this preferable configuration, the fluid flowing into the inlet space moves over the cutout in the radial direction and is then moved in the axial direction, so that the fluid can be absorbed.

It may be preferable that the communication portion and the inflow port are equal to each other in circumferential position. According to this preferable configuration, the fluid that has passed through the communication portion can be smoothly flown into the inflow port when the valve is opened.

It may be preferable that the sleeve is provided with at least another inflow port, and the inflow ports are formed symmetrically about a center axis of the spool on the outer periphery of the sleeve. According to this preferable configuration, the fluid flowing into the outlet space presses the spool in a substantially even balance from the radial direction to cancel the pressure applied to one side of the spool, so that the spool can be smoothly controlled.

It may be preferable that the inflow port is formed into an elongated hole shape elongated in a circumferential direction. According to this preferable configuration, the pressure of the fluid pressing the spool can be distributed in the circumferential direction.

DESCRIPTION OF EMBODIMENTS

Modes for carrying out a spool valve according to the present invention will be described below based on embodiments.

First Embodiment

A spool valve according to a first embodiment of the present invention will be described with reference to FIGS. 1 to 5. Hereinafter, the left side on the plane of the paper of FIG. 1 will be described as one end side in an axial direction of the spool valve, and the right side on the plane of the paper of FIG. 1 will be described as the other end side of the spool valve in the axial direction.

Further, inflow ports will be described as first ports 24, and an outflow port will be described as a second port 25.

A spool valve 1 is a spool solenoid valve and is used for a device that is controlled by hydraulic pressure, for example, an automatic transmission of a vehicle, or the like.

Figure 1:
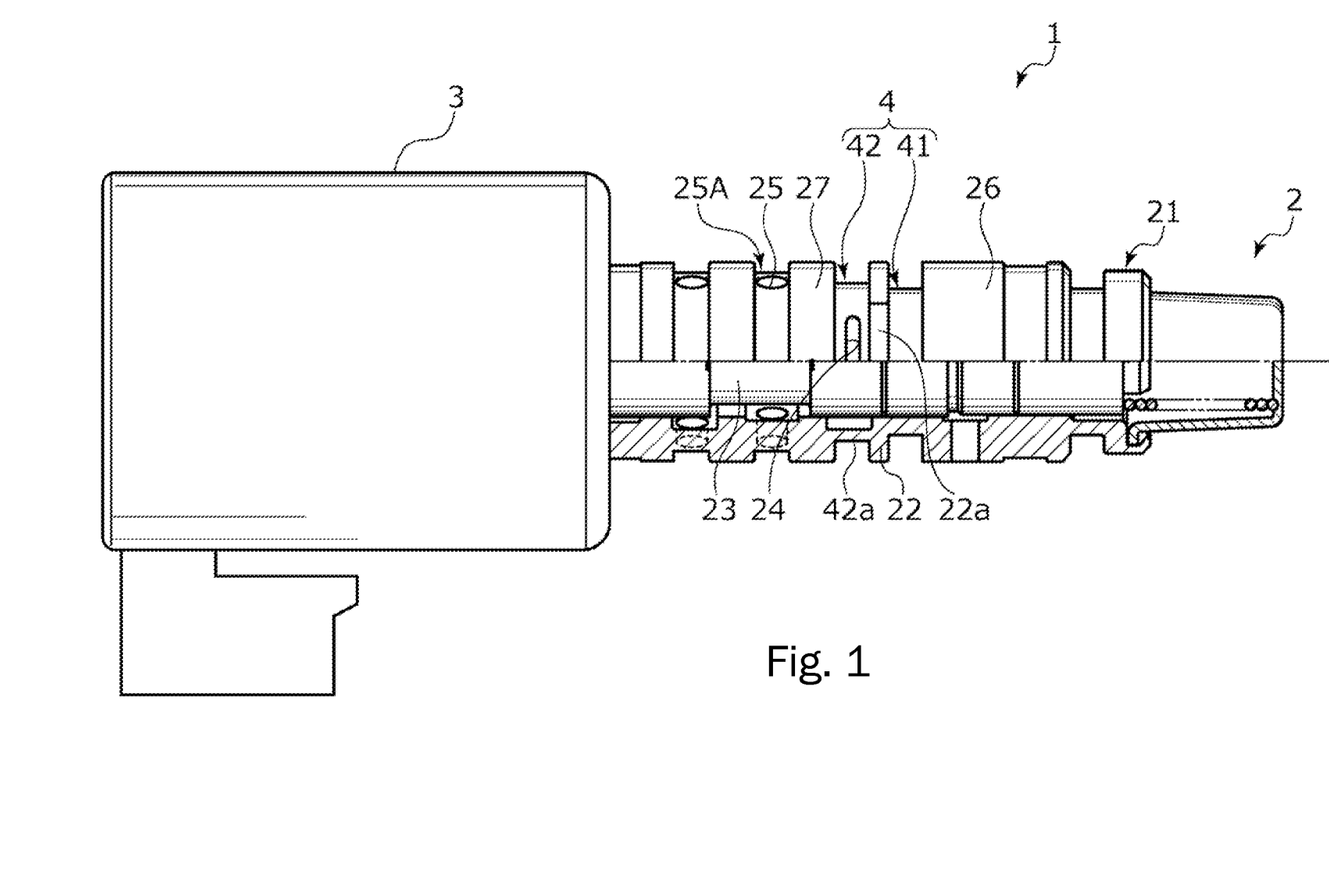
FIG. 1 is a side view showing a spool valve according to a first embodiment of the present invention, the view including a cross-sectional view in part.

As shown in FIG. 1, the spool valve 1 is configured such that a valve portion 2 for adjusting a flow rate of control fluid such as oil is integrally attached to a solenoid portion 3 as a drive unit. Further, an external view of the valve portion 2 is shown on the upper right side of the plane of the paper of FIG. 1, and an external appearance of a spool described later and a partial cross-sectional view of the valve portion 2 are shown on the lower right side of the plane of the paper. The spool valve is of a normally closed type in which during an off-state in which no power is supplied to the solenoid portion 3, the spool described later blocks the communication between the first ports and the second port and no fluid flows from the first ports into a sleeve. Hereinafter, a state in which power is supplied to the solenoid portion 3 will be described as an on-state, and a state in which no power is supplied to the solenoid portion 3 will be described as the off-state.

Figure 2:
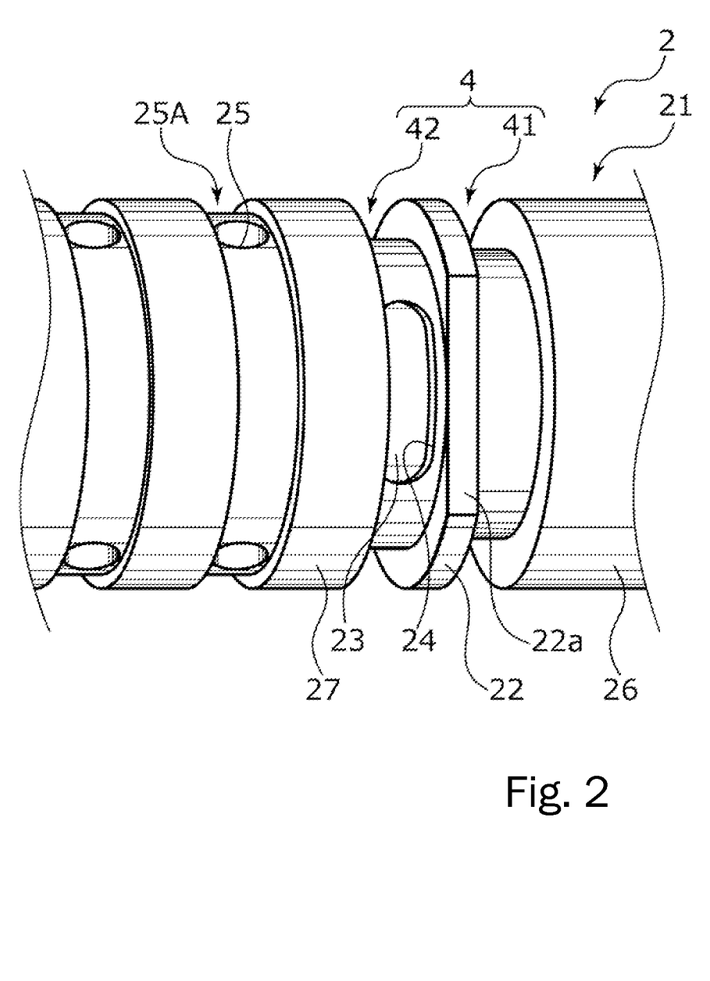
FIG. 2 is a perspective view showing a valve portion in the first embodiment.

First, the structure of the valve portion 2 will be described. As shown in FIGS. 1 and 2, the valve portion 2 mainly includes a substantially cylindrical sleeve 21 that is provided with the first ports 24 open in an elongated hole shape and the second port 25 open in a substantially circular shape, and a spool 23 (see FIGS. 1 and 4) placed liquid-tightly in an internal space that is formed on the radially inner side of the sleeve 21 to extend in the axial direction. The sleeve 21 and the spool 23 are made of a material such as aluminum, iron, stainless steel, or resin.

An endless annular supply groove 4 is formed on the outer peripheral surface of the sleeve 21 to be continuous in a circumferential direction. The supply groove 4 is partitioned by a partition wall 22 in the axial direction, and includes a first annular groove 41 formed into an annular shape, a second annular groove 42 formed into an annular shape, and the partition wall 22. A bottom surface 42a of the second annular groove 42 has first ports 24 formed at opposed positions in the circumferential direction, that is, at symmetric positions about the center of the spool in the radial cross section, and each of the ports has an elongated hole shape elongated in the circumferential direction. Further, the groove widths of the first annular groove 41 and the second annular groove 42 are formed to be substantially the same width, and the first annular groove 41 is formed to be deeper than the second annular groove 42. Further, the outer diameter of the partition wall 22 is the same as the outer diameters of a first land portion 26 and a second land portion 27.

Cutouts 22a are formed on the outer periphery of the partition wall 22 at opposed positions in the circumferential direction, in other words, at symmetric positions with respect to the radial direction in which the fluid is supplied, that is, at positions at an equal distance from a fluid supply hole 8b in the circumferential direction. As will be described later, spaces between the cutouts 22a and a fitting hole 8a of the housing 8 function as communication portions L (see FIG. 4) for communicating the first annular groove 41 and the second annular groove 42.

Figure 3:
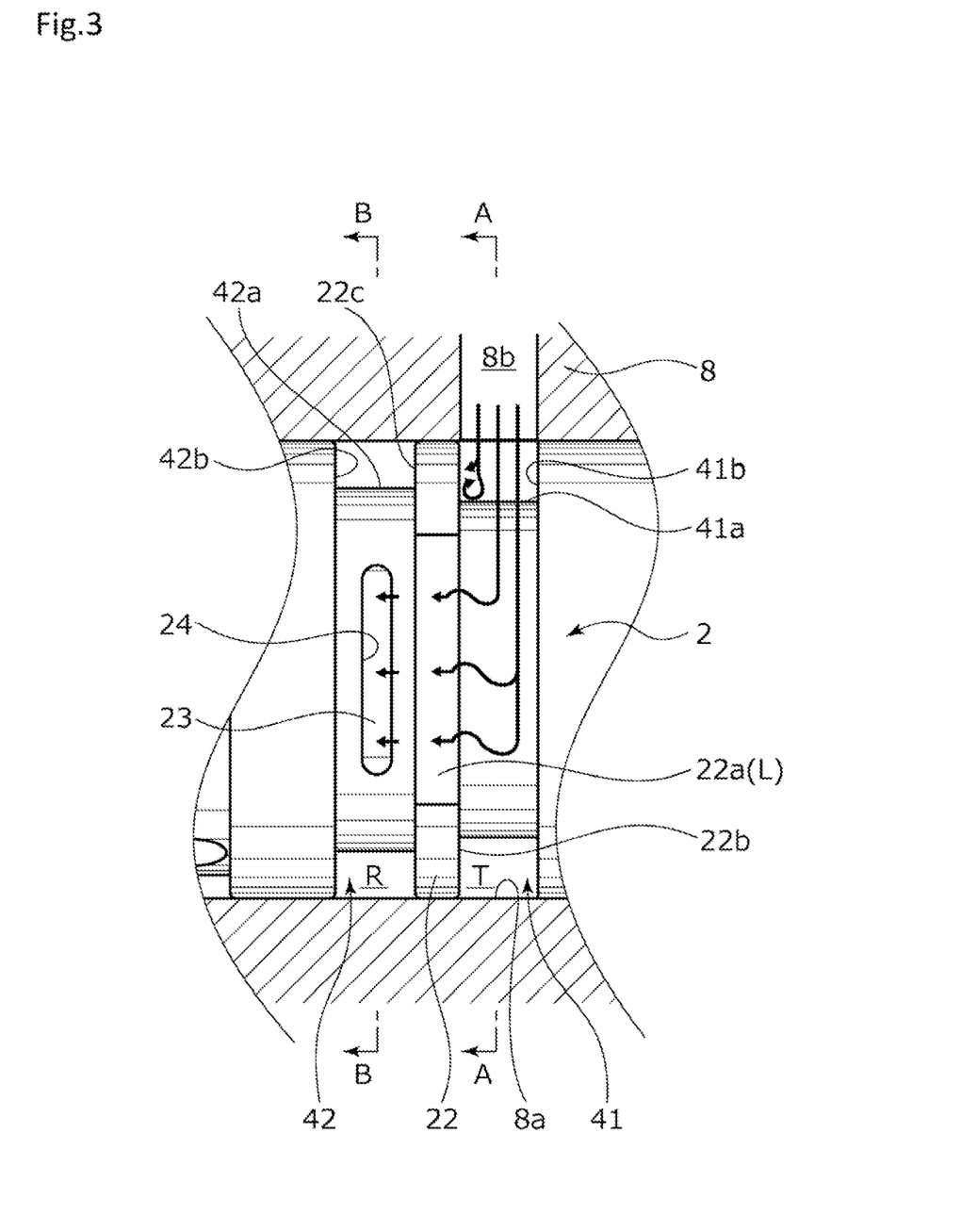
FIG. 3 is a schematic view showing the transmission of the supply dynamic pressure of the fluid when the supply dynamic pressure is high in the first embodiment.

As shown in FIG. 3, the valve portion 2 is inserted into the fitting hole 8a of the housing 8 to be used. In the fitting hole 8a, the fluid supply hole 8b through which the fluid is supplied to the valve portion 2 and a fluid outflow hole (not shown) through which the fluid is flown from the valve portion 2 to the housing 8 are formed. In the housing 8, the fluid supply hole 8b is communicated with the pressure source side (not shown), and the fluid outflow hole is communicated with the load side (not shown).

Specifically, the valve portion 2 is fitted into the fitting hole 8a such that the first annular groove 41 and the fluid supply hole 8b are aligned with each other in the axial direction, and the cutouts 22a are out of phase with the fluid supply hole 8b by substantially 90 degrees. More specifically, the groove width of the first annular groove 41 is formed to be substantially the same width as the opening width of the fluid supply hole 8b in the axial direction, and the center positions of the annular groove 41 and the fluid supply hole 8b are aligned with each other in the axial direction. Further, the valve portion 2 is provided such that the fluid outflow hole (not shown) is aligned with the second port 25 (see FIG. 2).

As shown in FIG. 3, when the valve portion 2 is fitted into the fitting hole 8a of the housing 8, the fluid can be supplied from the fluid supply hole 8b of the housing 8 into the first annular groove 41.

Here, FIG. 3 shows a mode in which a supply dynamic pressure is generated in the fluid when the solenoid portion 3 is switched to the on-state after the relatively long off-state. Such supply dynamic pressure is less frequently generated, but may be generated at the time of the switching as described above. FIG. 3 shows a state in which the first ports 24 are blocked by the spool 23 at the time of such switching, and the arrows in FIG. 3 indicate the transmission of the supply dynamic pressure. Further, during the state in which the first ports 24 are blocked as shown in FIG. 3, no flow is substantially generated in the fluid, but for convenience, the transmission direction of pressure and the direction in which the fluid tends to flow will be described below simply as a flow. The same applies to the arrows in FIGS. 4 and 5, which will be described later.

The first annular groove 41 is formed by a bottom surface 41a, a side surface 41b, and a side surface 22b, and is formed into an annular groove continuous in the circumferential direction. The bottom surface 41a extends in parallel to the axis of the spool 23 and is formed radially inward of the sleeve 21, and the side surface 41*b* and the side surface 22*b* extend orthogonally to the bottom surface 41*a* and extend toward the radially outer side of the sleeve 21. Thus, an inlet space T is formed by the inner surface of the fitting hole 8*a* and the first annular groove 41 to hold the fluid. The fluid flowing from the fluid supply hole 8*b* into the inlet space T is smoothed such that the supply dynamic pressure thereof is smoothed by the fluid held in the inlet space T, that is, the inlet space T is configured to perform an absorbing function.

Figure 4:
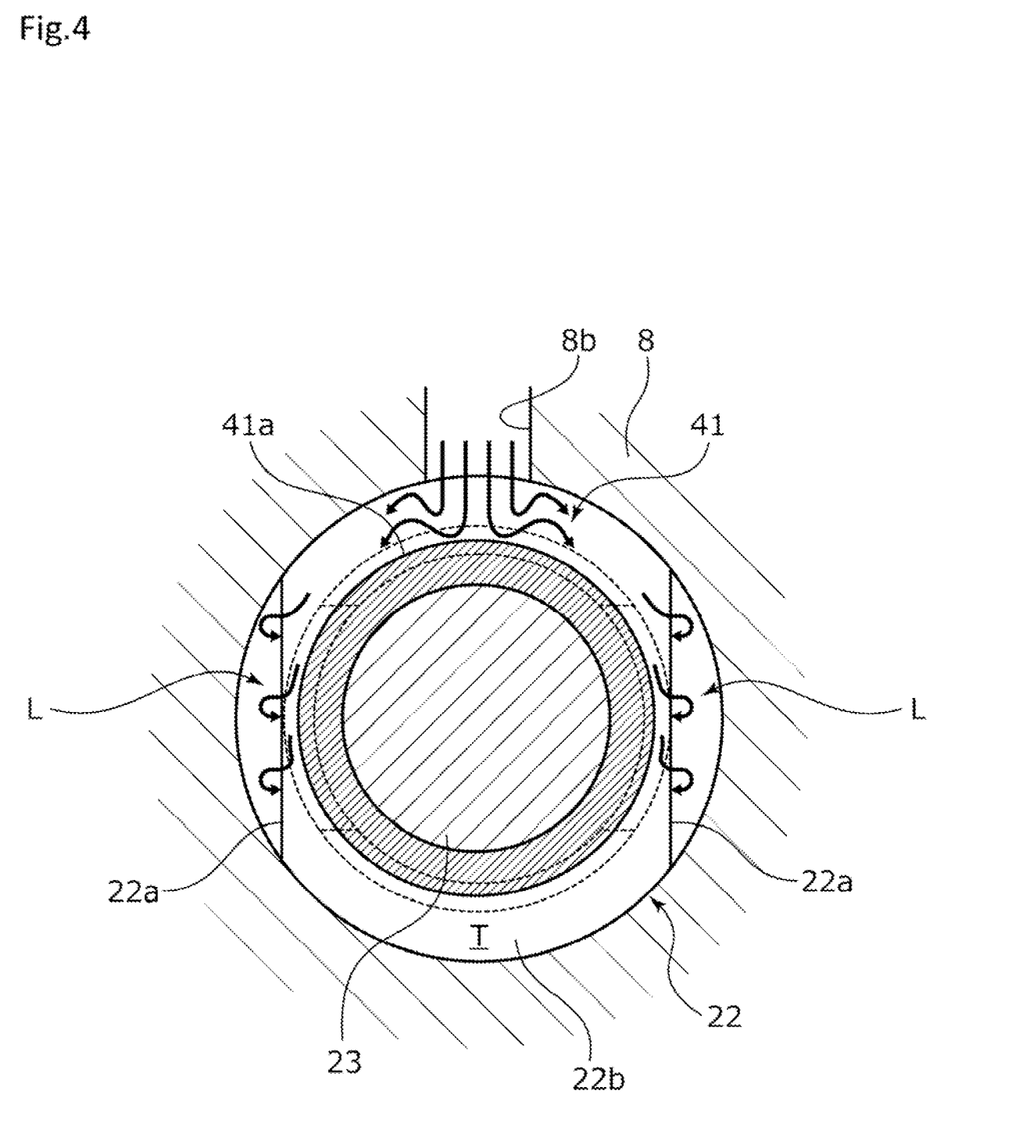
FIG. 4 is a cross-sectional view taken along the line A-A of FIG. 3 in the first embodiment.

Further, the fluid supply hole 8*b* and the bottom surface 41*a* face each other as shown in FIG. 4, so that the fluid flowing from the fluid supply hole 8*b* into the inlet space T is divided into the left side and the right side in FIG. 4. Such division further absorbs the supply dynamic pressure of the fluid. The bottom surface 41*a* of the first annular groove 41 facing the fluid supply hole 8*b* may have a linear shape, and in this case, the straight line is preferably orthogonal to the extending direction of the fluid supply hole 8*b*. Further, the fluid supply hole 8*b* and the two cutouts 22*a* are preferably provided to be out of phase with each other by substantially 90 degrees.

Returning to FIG. 3, since the partition wall 22 has the two cutouts 22*a* formed to face each other in the circumferential direction, the communication portions L (see FIG. 4) are formed by the inner surface of the fitting hole 8*a* and the cutouts 22*a* to communicate the first annular groove 41 and the second annular groove 42. Further, the communication portions L are provided to be out of phase with the fluid supply hole 8*b* by substantially 90 degrees, and the communication portions L are located on the side of the first ports 24 of the inlet space T in the axial direction. Accordingly, the fluid flowing into the inlet space T is flown to the side of the communication portions L through a path curved from the circumferential direction to the axial direction. In this way, when the fluid moves from the inlet space T to the communication portions L, the direction of the fluid is changed from the circumferential direction to the axial direction, the supply dynamic pressure of the fluid is further absorbed.

Further, as shown in FIG. 4, the communication portions L are formed on the outer periphery of the partition wall 22 protruding in the radial direction, so that the fluid within the inlet space T moves over the side surface 22*b* of the partition wall 22 in the radial direction. Thus, when the fluid moves from the inlet space T to the communication portions L, the supply dynamic pressure is absorbed by such movement of the fluid over the side surface as well as by the above-mentioned change in direction.

As shown in FIG. 3, the fluid that has passed through the communication portions L flows into an outlet space R. The second annular groove 42 is formed by a bottom surface 42*a*, a side surface 42*b*, and a side surface 22*c* and is formed into an annular groove continuous in the circumferential direction. Accordingly, the outlet space R is formed by the inner surface of the fitting hole 8*a* and the second annular groove 42 to hold the fluid. When the fluid flows from the communication portions L into the outlet space R during the off-state, the supply dynamic pressure thereof is further smoothed and absorbed by the fluid held in the outlet space R. Further, the volume of the outlet space R is larger than that of the communication portions L, so that the fluid flowing from the communication portions L into the outlet space R spreads within the outlet space R. This further absorbs the supply dynamic pressure of the fluid. The absorbing action described above makes it difficult for the fluid to press the spool 23 in the radial direction.

Further, the communication portions L and the first ports 24 are formed in the same phase, so that the fluid that has passed through the communication portions L can be smoothly flown from the first ports 24 into the sleeve 21 during the on-state.

Further, since the first annular groove 41 is formed to have a deeper groove than the second annular groove 42, the inlet space T formed in the first annular groove 41 can contain more fluid than the outlet space R formed in the second annular groove 42 (see FIG. 3). This can reliably absorb the supply dynamic pressure supplied from the fluid supply hole 8*b*.

Further, since the second annular groove 42 can hold the fluid within the outlet space R, it also functions as a storage tank for feeding the fluid held within the outlet space R through the first ports 24 to the load when fluid is required to be immediately supplied to the load connected to the second port 25 (see FIG. 1).

Further, the opening area of each first port 24 formed into the elongated hole shape is larger than the opening area of the second port 25. Accordingly, the flow rate of the fluid required at the connection destination of the second port 25 can be sufficiently supplied toward the second port 25.

Figure 5:
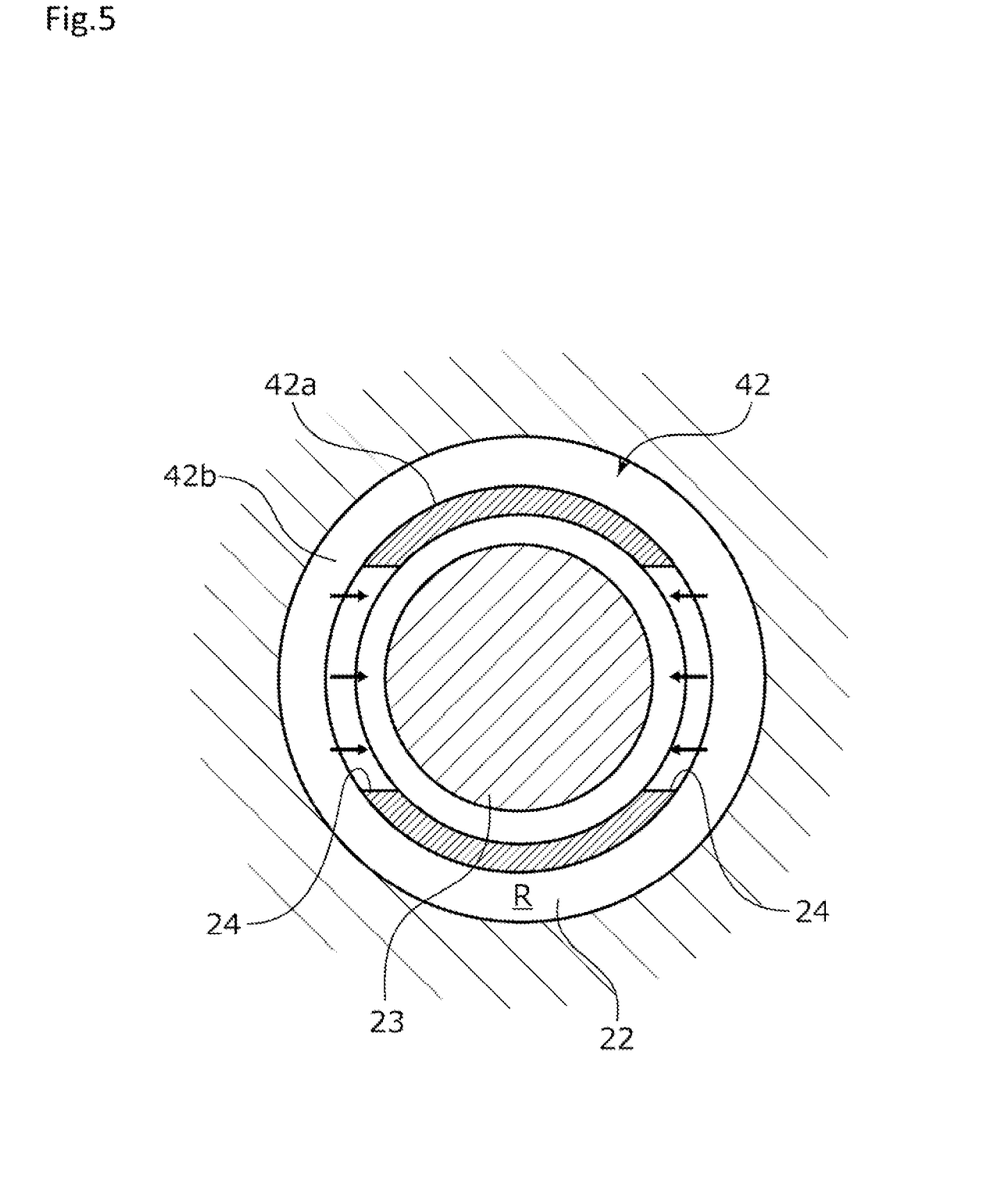
FIG. 5 is a cross-sectional view taken along the line B-B of FIG. 3 in the first embodiment.

As shown in FIG. 5, the bottom surface 42*a* of the second annular groove 42 has the first ports 24 formed at the opposed positions in the circumferential direction, that is, at the symmetric positions about the center of the spool in the radial cross section, and the ports have each an elongated hole shape elongated in the circumferential direction. Accordingly, the absorbed fluid within the outlet space R presses the spool 23 with equal pressure from the left and the right in FIG. 5 during the off-state, so that the force due to the fluid acting on the spool 23 in the radial direction is small or not substantially generated. Thus, the spool 23 can be smoothly moved in the axial direction without being pressed against the inner wall of the sleeve 21 at the time of switching to the on-state. Further, since the first ports 24 have an elongated hole shape elongated in the circumferential direction, the force with which the fluid presses the spool 23 is distributed in the circumferential direction, so that the spool 23 is easily moved in the axial direction.

Further, in order to smoothly move the spool 23 relative to the sleeve 21, the sleeve 21 and the spool 23 are preferably anodized or are subjected to electroless plating with high uniformity of the plating thickness. For example, they may be subjected to plating with Ni (nickel)-P (phosphorus)-B (boron) as the main coating composition to improve the hardness and the friction resistance. Further, the sleeve 21 and the spool 23 may be subjected to composite plating in which Ni (nickel)-P (phosphorus) is used as the main coating composition and PTFE (polytetrafluoroethylene) particles are added thereto to prevent friction between the sleeve 21 and the spool 23.

In this way, in a spool valve, the spool 23 is arranged on the inside of the sleeve 21 provided with the first ports 24 and the second port 25 to be movable in a longitudinal direction and the fluid is supplied from the fluid supply hole 8*b* of the housing 8 into the first ports 24. The supply groove 4 is formed on the outer periphery of the sleeve 21, and the supply groove 4 includes the inlet space T into which fluid flows from the fluid supply hole 8*b* and the outlet space R formed on the side of the first ports 24 of the inlet space T in the axial direction. Thus, when the fluid supplied from the fluid supply hole 8*b* to the supply groove 4 first flows into the inlet space T, the supply dynamic pressure thereof is absorbed, and when the fluid then moves into the outlet space R formed on the side of the first ports 24, the supply dynamic pressure thereof is further absorbed, so that the spool 23 is smoothly controlled regardless of whether the control pressure of the fluid is high or low.

Further, since the inlet space T is formed into an annular shape, the fluid is held within the annular inlet space T, so that the fluid is easily absorbed.

Further, the partition wall 22 is provided to be adjacent to the inlet space T and be formed to protrude in the radial direction of the sleeve 21, and the partition wall 22 has the communication portions L formed to communicate the inlet space T and the outlet space R. Thus, the fluid flown into the inlet space T is bypassed by the communication portions L formed on the partition wall 22 and is flown to the outlet space R, so that the fluid can be absorbed.

The communication portions L are the cutouts 22a formed on the outer periphery of the partition wall 22. Accordingly, the fluid flown into the inlet space T moves over the cutouts 22a in the radial direction and is then moved in the axial direction, so that the fluid can be absorbed.

Further, since the communication portions L and the first ports 24 are formed in the same phase, the fluid that has passed through the communication portions L can be smoothly flown into the first ports 24 during the on-state.

Further, since the first ports 24 are oppositely formed on the outer periphery of the sleeve 21, the fluid flown into the outlet space R presses the spool 23 in a substantially even balance from the radial direction to cancel the pressure that is applied to one side of the spool 23, so that the spool 23 can be smoothly controlled.

Further, since the first ports 24 are formed into an elongated hole shape elongated in the circumferential direction, the pressure of the fluid pressing the spool 23 can be distributed in the circumferential direction.

Further, the outlet space R of the supply groove 4 is arranged closer to the side of the second port 25 compared to the inlet space T, so that the fluid supply hole 8b is arranged at a position away from a third annular groove 25A, and the fluid is less likely to leak to the second port 25 through a gap between the fitting hole 8a and the sleeve 21.

Further, the inlet space T is on the opposite side of the outlet space R from the solenoid portion 3, and the force in the depth direction of the fitting hole 8a due to the pressure of the fluid mainly acts on the sleeve 21, so that the spool valve 1 is less likely to be detached from the housing 8.

Second Embodiment

Figure 6:
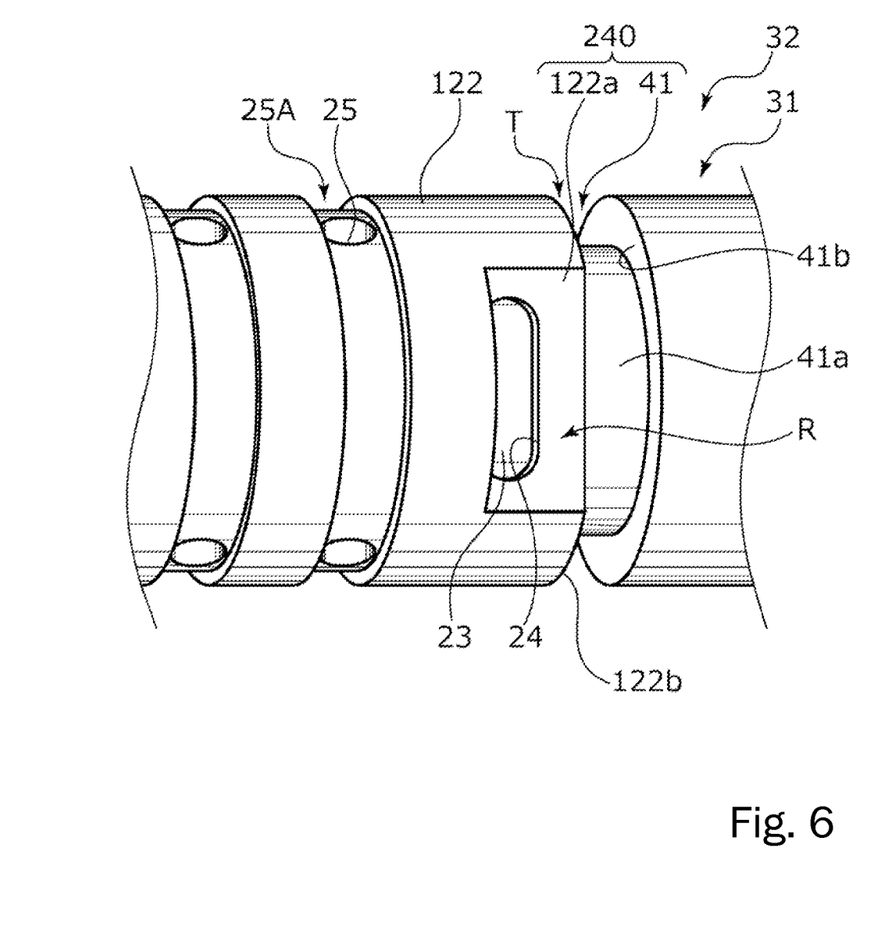
FIG. 6 is a perspective view showing a valve portion of a spool valve according to a second embodiment of the present invention.

Next, a spool valve according to a second embodiment of the present invention will be described with reference to FIG. 6. The same components as those shown in the embodiment described above are noted by the same reference numerals, and duplicate descriptions will be omitted.

A supply groove 240 of the spool valve according to the second embodiment mainly includes the first annular groove 41 and cutouts 122a formed on a partition wall 122, and a side surface 122b of the first annular groove 41 forms a part of the partition wall 122.

The partition wall 122 according to the second embodiment is formed to extend longer in the axial direction than the partition wall 22 according to the first embodiment, and is formed to extend in the axial direction from the first annular groove 41 to the third annular groove 25A formed into an annular shape and having the second port 25 formed at the bottom surface.

The annular outer periphery of the partition wall 122 is cut out from the side of the side surface 122b halfway through the third annular groove 25A in the axial direction with a plane (a plane parallel to the plane of the paper of FIG. 6) to form the cutouts 122a, and the cutouts 122a are formed at opposed positions in the circumferential direction, in other words, at symmetric positions with respect to the radial direction in which the fluid is supplied, that is, at positions at an equal distance from the fluid supply hole 8b in the circumferential direction such that the partition wall 122 forms a substantially stadium shape when viewed in the axial direction. The cutouts 122a have each the first ports 24.

A valve portion 32 according to the second embodiment described above is inserted into the fitting hole 8a of the housing 8, and the first annular groove 41 and the fluid supply hole 8b are aligned with each other. The inlet space T is formed by the inner peripheral surface of the fitting hole 8a and the first annular groove 41 to perform an absorbing function in which the fluid flowing from the fluid supply hole 8b into the first annular groove 41 is smoothed such that the supply dynamic pressure thereof is smoothed. Further, the outlet space R is formed by the inner peripheral surface of the fitting hole 8a and the cutouts 122a to hold the fluid during the off-state and to flow the fluid into the first ports 24 during the on-state.

Since the side surface 122b constituting the first annular groove 41 is cut out, the fluid is absorbed in the inlet space T and is then moved to the outlet space R. Further, the side surface 122b protrudes in the radial direction from the bottom surface 41a of the first annular groove 41. Accordingly, when the fluid flows from the inlet space T to the outlet space R, the direction of the fluid is changed from the circumferential direction to the axial direction, and the fluid moves over the side surface 122b of the partition wall 122 in the radial direction, so that the supply dynamic pressure can be further absorbed.

Third Embodiment

Figure 7:
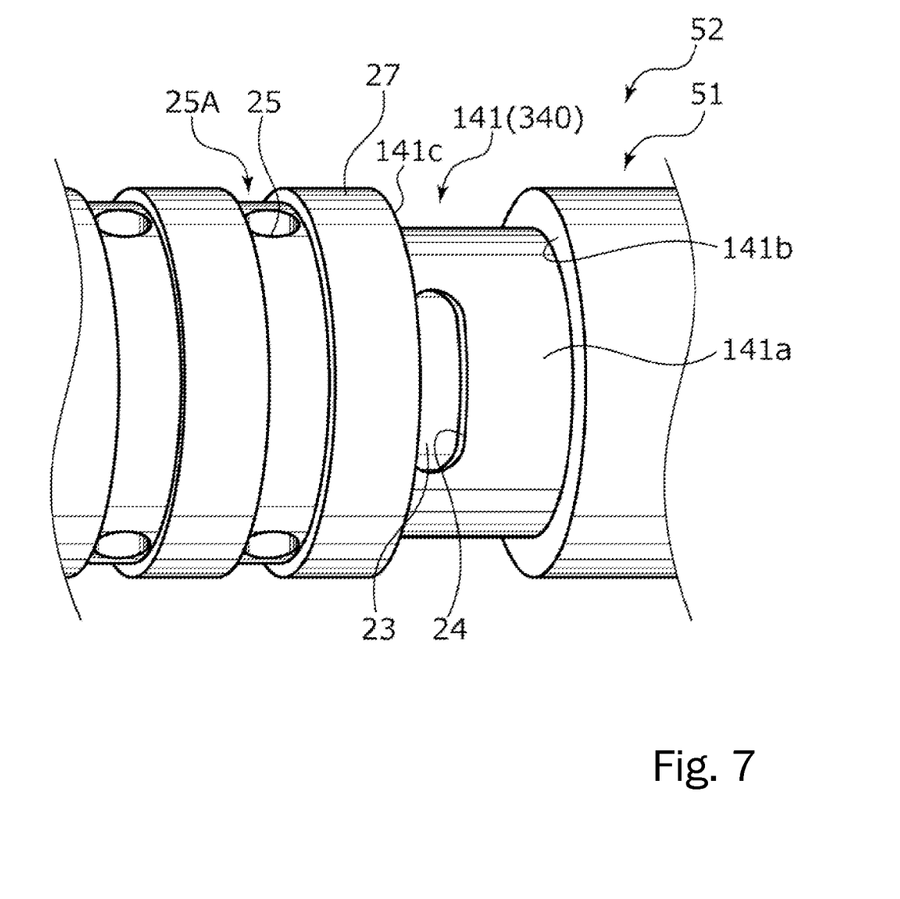
FIG. 7 is a perspective view showing a valve portion of a spool valve according to a third embodiment of the present invention.

Next, a spool valve according to a third embodiment of the present invention will be described with reference to FIG. 7. The same components as those shown in the embodiment described above are noted by the same reference numerals, and duplicate descriptions will be omitted.

A supply groove 340 of the spool valve according to the third embodiment mainly includes an annular groove 141 that is continuous in the circumferential direction and has an endless annular shape. The annular groove 141 is formed by a bottom surface 141a, a side surface 141b, and a side surface 141c, and the first ports 24 are formed at opposed positions in the circumferential direction of the bottom surface 141a. The annular groove 141 is formed longer in the axial direction than the first annular groove 41 according to the first embodiment.

Figure 8:
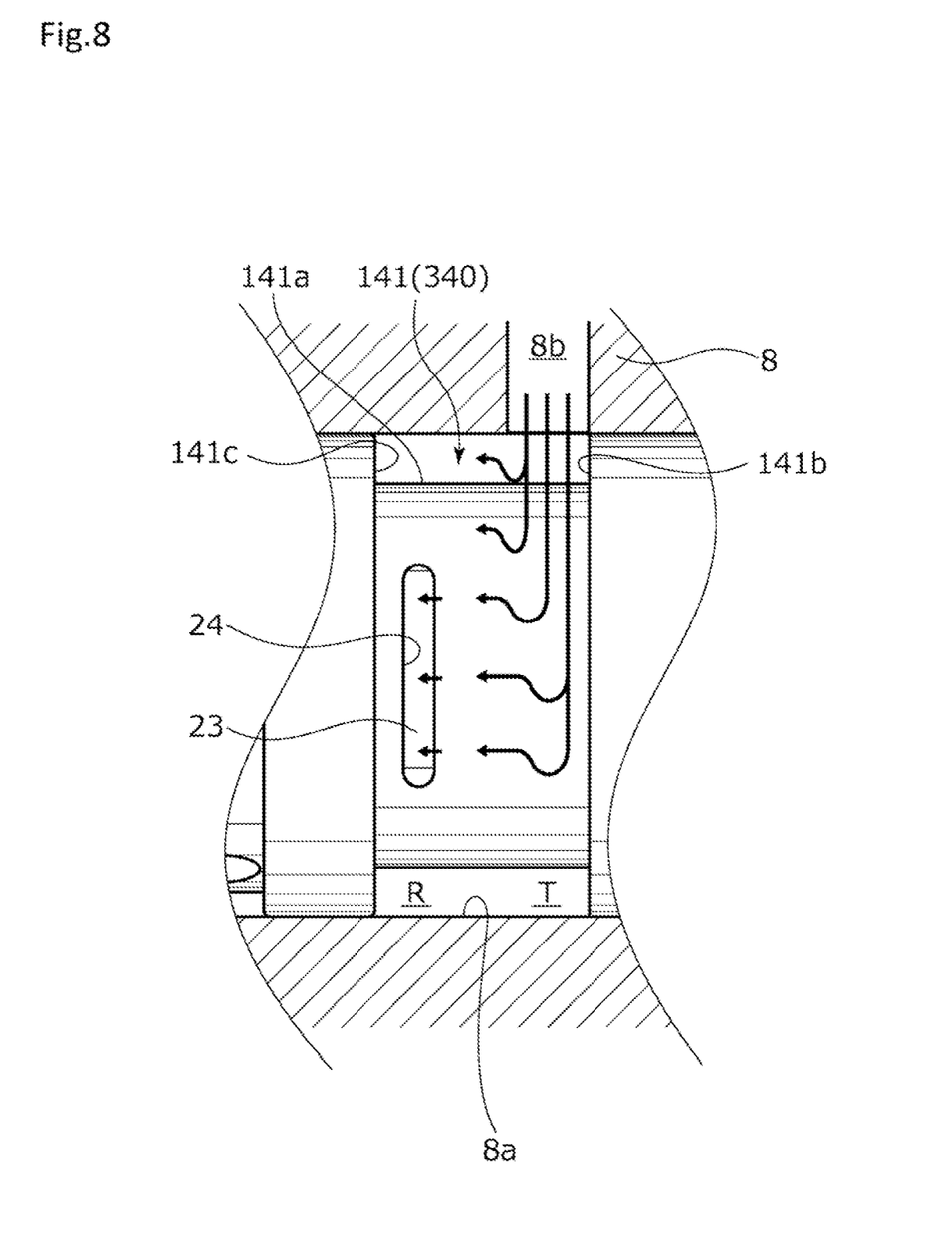
FIG. 8 is a schematic view showing the transmission of the supply dynamic pressure of the fluid when the supply dynamic pressure is high in the third embodiment.

As shown in FIG. 8, a valve portion 52 is inserted into the fitting hole 8a of the housing 8 and is provided such that the position of the other end of the fluid supply hole 8b in the axial direction and the position of the side surface 141b of the annular groove 141 in the axial direction are aligned with each other. Further, FIG. 8 shows a mode in which a supply dynamic pressure is generated in the fluid when the solenoid portion 3 (see FIG. 1) is switched to the on-state after a relatively long off-state. Such supply dynamic pressure is less frequently generated, but may be generated at the time of the switching described above. FIG. 8 shows a state in which the first ports 24 are blocked by the spool 23 at the time of such switching, and the arrows in FIG. 8 indicate the transmission of the supply dynamic pressure. Further, during the state where the first ports 24 are blocked as shown in FIG. 8, no flow is substantially generated in the fluid, but for convenience, the transmission direction of pressure and the direction in which the fluid tends to flow will be described simply as a flow.

The annular groove 141 is an annular groove continuous in the circumferential direction, and the inlet space T and the outlet space R are formed adjacent to each other by the inner surface of the fitting hole 8a and the annular groove 141 to hold the fluid. The inlet space T is formed into an annular shape at a position where the fluid supply hole 8b and the annular groove 141 face each other in the axial direction, and performs an absorbing function in which the fluid flowing from the fluid supply hole 8b into the annular groove 141 is smoothed such that the supply dynamic pressure thereof is smoothed by the fluid held within the annular groove 141.

In this way, when the fluid supplied from the fluid supply hole 8b to the annular groove 141 as the supply groove 340 first flows into the inlet space T, the supply dynamic pressure thereof is absorbed, and when it then moves into the outlet space R formed adjacent to the inlet space T in the axial direction, the direction of the fluid is changed from the circumferential direction to the axial direction, so that the supply dynamic pressure is further absorbed. Accordingly, the spool 23 is smoothly controlled regardless of whether the control pressure of the fluid is high or low.

Although the embodiments of the present invention have been described above with reference to the drawings, the specific configurations are not limited to these embodiments, and any changes or additions within the scope of the scope of the present invention are included in the present invention.

For example, in the embodiments described above, an example in which the spool is driven by a solenoid has been described, but the means for driving the spool may be means other than the solenoid, for example, an electric motor.

Further, in the embodiments described above, the normally closed spool valve in which no fluid flows into the sleeve from the first ports during the off-state in which no power is supplied to the drive unit has been described, but the present invention is not limited to this and may be applied to a normally open spool valve.

Further, although the first ports 24 have been described as having an elongated hole shape elongated in the circumferential direction of the sleeve 21, the present invention is not limited to this, and they may have a circular shape. Further, although the first ports 24 are arranged at opposed positions in the circumferential direction of the sleeve 21, the present invention is not limited to this, and a plurality of first ports 24 may be equiangularly arranged in the circumferential direction of the sleeve 21. In this case, a plurality of circular first ports of the sleeve 21 are preferably provided opposed to one another.

Further, in the embodiments described above, an example in which the outlet space R of the supply groove 4 on the outer periphery of the sleeve 21 is formed closer to the side of the second port 25 compared to the inlet space T has been described, but the inlet space T may be formed closer to the side of the second port 25 compared to the outlet space R.

Further, an example in which the second port 25 is formed closer to the side of the solenoid portion 3 compared to the first ports 24 has been described, but the first ports 24 may be formed closer to the side of the solenoid portion 3 compared to the second port 25.

Further, an inflow port is described as the first port and an outflow port is described as the second port, but the present invention is not limited to this. Considering the direction of the fluid flowing from the outside of the spool valve to the sleeve, the second port may be used as an inflow port, and the discharge port for discharging the fluid flowing from the second port into the spool valve to the outside of the spool valve may be used as an outflow port. That is, a port through which the fluid flows from the outside into the spool valve is an inflow port, and a port through which the fluid flows from the spool valve to the outside of the spool valve is an outflow port. The supply groove according to the present invention may be any groove as long as it is formed around a port through which fluid flows from the outside into the spool valve. In addition, a plurality of inflow ports may be provided. For example, each of the inflow ports may function as an inflow port and another port may function as an outflow port.

REFERENCE SIGNS LIST

1 Spool valve
2 Valve portion
3 Solenoid portion
4 Supply groove
8 Housing
8a Fitting hole
8b Fluid supply hole
21 Sleeve
22 Partition wall
22a Cutout
23 Spool
24 First port
25 Second port
25A Third annular groove
31 Sleeve
32 Valve portion
40 Supply groove
41 First annular groove
42 Second annular groove
51 Sleeve
52 Valve portion
122 Partition wall
122a Cutout
122b Side surface
141 Annular groove
240 Supply groove
340 Supply groove
R Outlet space
L Communication portion
T Inlet space

The invention claimed is:

1. A spool valve comprising a sleeve and a spool arranged on an inside of the sleeve to be movable in a longitudinal direction, the sleeve being provided with an inflow port into which fluid is supplied from an external fluid supply hole, and an outflow port through which the fluid is flown to an outside of the sleeve, wherein
a supply groove is formed on an outer periphery of the sleeve, and
the supply groove includes an inlet space into which the fluid flows from the fluid supply hole and an outlet space formed on a side of the inflow port with respect to the inlet space in an axial direction, and
the spool valve further comprises a partition wall adjacent to the inlet space and formed to protrude in a radially outward direction of the sleeve, the partition wall having a communication portion formed to communicate the inlet space and the outlet space.

2. The spool valve according to claim 1, wherein the inlet space is formed into an annular shape.

3. The spool valve according to claim 1, wherein the communication portion is a cutout formed on the outer periphery of the partition wall.

4. The spool valve according to claim 1, wherein the communication portion and the inflow port are equal to each other in circumferential position.

5. The spool valve according to claim 1, wherein the sleeve is provided with at least another inflow port, and the inflow ports are formed symmetrically about a center axis of the spool on the outer periphery of the sleeve.

6. The spool valve according to claim 1, wherein the inflow port is formed into an elongated hole shape elongated in a circumferential direction.

7. The spool valve according to claim 3, wherein the communication portion and the inflow port are equal to each other in circumferential position.

8. The spool valve according to claim 2, wherein the sleeve is provided with at least another inflow port, and the inflow ports are formed symmetrically about a center axis of the spool on the outer periphery of the sleeve.

9. The spool valve according to claim 2, wherein the inflow port is formed into an elongated hole shape elongated in a circumferential direction.

10. The spool valve according to claim 3, wherein the sleeve is provided with at least another inflow port, and the inflow ports are formed symmetrically about a center axis of the spool on the outer periphery of the sleeve.

11. The spool valve according to claim 3, wherein the inflow port is formed into an elongated hole shape elongated in a circumferential direction.

12. The spool valve according to claim 4, wherein the sleeve is provided with at least another inflow port, and the inflow ports are formed symmetrically about a center axis of the spool on the outer periphery of the sleeve.

13. The spool valve according to claim 4, wherein the inflow port is formed into an elongated hole shape elongated in a circumferential direction.

* * * * *